United States Patent [19]

Urbanic et al.

[11] Patent Number: 5,280,726
[45] Date of Patent: Jan. 25, 1994

[54] APPARATUS AND METHOD FOR MEASURING FLOW RATE OF MOLTEN ALUMINUM THROUGH A TROUGH

[75] Inventors: John M. Urbanic, Pittsburgh; Daniel W. Severa, Brackenridge; Eric D. Arndt, Lower Burrell, all of Pa.

[73] Assignee: Aluminum Company of America, Pittsburgh, Pa.

[21] Appl. No.: 864,886

[22] Filed: Apr. 3, 1992

[51] Int. Cl.$^5$ .............................................. G01F 1/00
[52] U.S. Cl. ............................ 73/861.12; 73/861.11
[58] Field of Search ................ 73/861, 861.11–861.17, 73/863.41, 198, 201; 266/99, 160; 75/387

[56] References Cited

U.S. PATENT DOCUMENTS

| | | | |
|---|---|---|---|
| 951,176 | 3/1910 | Buis | 73/215 |
| 4,297,180 | 10/1981 | Foster, Jr. | 204/67 |
| 4,507,975 | 4/1985 | Bittner et al. | |
| 4,716,649 | 1/1988 | Bittner et al. | |
| 4,741,216 | 5/1988 | Bates et al. | 73/861.12 |
| 5,060,530 | 10/1991 | Haughton | 73/DIG. 9 |

FOREIGN PATENT DOCUMENTS

59-178166 10/1984 Japan .

OTHER PUBLICATIONS

Hemp, et al., Electromagnetic Flowmeters—A State of the Art Review, International Conference on Advances in Flow Measurement Techniques, Sep. 9-11, 1981, pp. 319-340.

Primary Examiner—Richard E. Chilcot, Jr.
Assistant Examiner—R. Biegel
Attorney, Agent, or Firm—Richard V. Westerhoff; David W. Brownlee

[57] ABSTRACT

The flow rate of molten aluminum through a trough is measured by damming off the trough and diverting the flow through the measuring tube of a magnetic flow meter having a diameter, and located at a level in the trough to create a head of molten aluminum sufficient to produce a flow through the tube which is within the operating range of the meter. The apparatus includes a pair of spaced apart dam members forming a cavity therebetween which is transversed by the measuring tube. The magnet of the flow meter is located in the cavity preferably in a housing through which cooling air is circulated. The electrodes are made of an electrically conductive material which is resistant to corrosion by the molten aluminum, preferably, titanium diboride. Spring biased tapered connections seal the measuring tube with the dam members which have peripheral seals to keep molten aluminum out of the cavity.

18 Claims, 3 Drawing Sheets

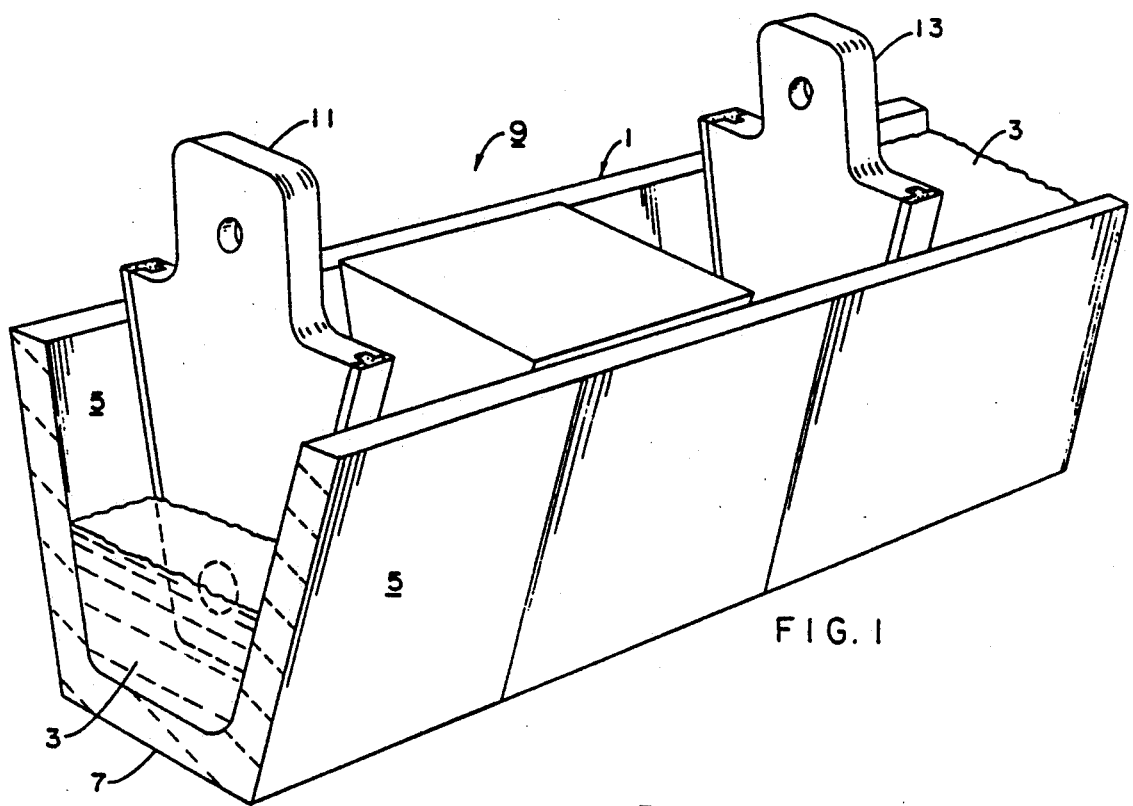
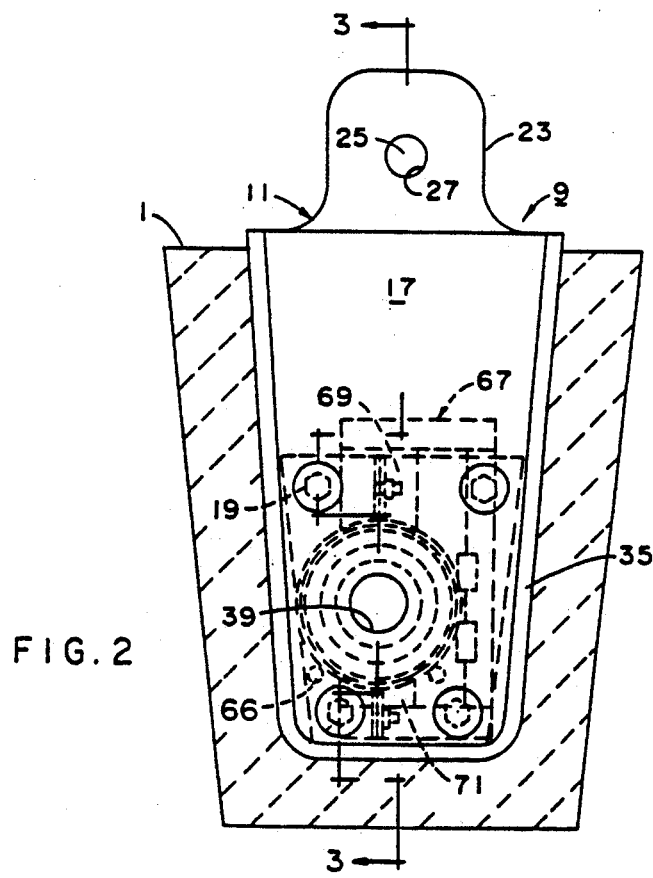

APPARATUS AND METHOD FOR MEASURING FLOW RATE OF MOLTEN ALUMINUM THROUGH A TROUGH

BACKGROUND OF THE INVENTION

1. Field of the Invention

This invention relates to the measurement of the flow of molten aluminum, and in particular, the flow of molten aluminum through a trough using a magnetic flow meter.

2. Background Information

Magnetic flow meters for measuring the flow rate of electrically conductive liquids are well known. They operate on the principle that a conductive liquid flowing through a magnetic field applied at right angles to the direction of flow generates an electromotive force or voltage. This voltage is proportional to the velocity of the conductive liquid. By knowing the cross-sectional area of the flow, the volumetric flow rate is easily calculated.

Magnetic flow meters have some very desirable characteristics. First, the design is very simple; there are no moving parts. There also are no internal impediments to flow, they can operate in high temperature environments, they are versatile in that they can be installed in any desired location or position, they have a broad measurement span, they can measure bidirectional flow, they are unaffected by variations in viscosity, pressure, temperature and density of the media, and they have an accuracy of at least better than plus or minus 2%.

Magnetic flow meters have been successfully employed in industry for over two decades for monitoring flow control of molten sodium in nuclear reactors and for the measurement of the flow rates of molten brass, lead and a variety of other fluids with the only criteria for implementation being that the media be electrically conductive.

However, applicants are aware of no successful application of a magnetic flow meter to measuring the flow of molten aluminum, which presents special problems. First, the temperature of the molten aluminum is high, typically about 1350° F. Also, molten aluminum is highly reactive. Not only must the components which contain the molten aluminum be resistant to corrosion, but even more importantly, the electrodes of the magnetic flow meter must be capable of operating with hot molten aluminum for prolonged periods of time without eroding, fouling or changing their electrical characteristics.

U.S. Pat. No. 4,741,216 proposes either lining or constructing the measuring tube of a magnetic flow meter through which molten aluminum passes with silica carbide to resist corrosion. However, this patent also suggests using wire electrodes without specifying any particular material. Common high temperature electrode materials like steel wire are rapidly dissolved by molten aluminum. But even slow erosion causes drifting of the meter as the voltage generated by the meter is directly proportional to the distance between the electrodes. Erosion or fouling changes this critical distance.

U.S. Pat. Nos. 4,507,975 and 4,716,649 disclose a magnetic flow meter for measuring the flow rate of the liquid sodium, for instance, in a nuclear reactor, and uses platinum or platinum alloys for the electrodes. Such materials are dissolved by molten aluminum.

Molten aluminum is also very difficult to contain. It can leak through any crack or crevice through which water can pass. This property of molten aluminum, considered in addition to its high temperature and reactivity, make it very difficult to select materials and effect seals.

Because of the difficulty in containing molten aluminum, it is usually conveyed in open troughs rather than enclosed pipes. In the typical production process, flow rates of a molten aluminum are not measured, but obtained indirectly by some other measurable quantity or variable of the process such as pumping speed, changes in metal height, mass flow by temperature balance calculation and casting rates. None of these approaches provide an accurate, real time indication of flow rates of the molten metal. In addition, the accuracy of each measurement is restricted to the techniques used to obtain the values of the described process parameters. At present, no direct reading operational flow meter system exists for molten aluminum flow measurement.

Accordingly, it is a primary object of the invention to provide on-line, real time magnetic flow meter measurement of molten aluminum flow rates and in particular, measurement of molten aluminum flow rates through a trough.

SUMMARY OF THE INVENTION

This object, and others which will become evident through a reading of the following description, are realized by the invention which includes as one aspect a magnetic flow meter for measuring the flow rate of molten aluminum in a trough which includes a pair of spaced apart dam members which block off flow in the trough and create a cavity free of molten aluminum between them. A non-magnetic measuring tube having a bore with a non-conductive, non-reactive surface extends through the two dam members for establishing a flow of molten aluminum of known cross-sectional area. The magnet of the flow meter, which must be protected from the high temperature of the molten aluminum, is mounted in the cavity adjacent the measuring tube. A pair of spaced apart electrodes extend through the measuring tube and contact the molten aluminum. These electrodes are made of a material which is electrically conductive and resists corrosion by the molten aluminum. It is another aspect of the invention that these electrodes are both made of titanium diboride ($TiB_2$). Other suitable electrode materials include zirconium diboride ($ZrB_2$) and hafnium diboride ($HfB_{2}$).

In a preferred form of the flow meter as adapted for measuring flow in a trough, the ends of the measuring tubes are tapered axially and the dam members have mating tapered apertures in which the tube ends seat. Spring biasing means urge the tapered ends of the measuring tube and apertures in the dam members into leak proof mating relation.

The dam members have peripheral seals which bear against the walls of the trough to keep molten aluminum out of the cavity.

As a further aspect of the invention, the magnet is mounted to provide a flux flowing vertically through the molten aluminum in the measuring tube to accommodate the generally narrow width of the trough. At the same time, it is important to position the measuring tube as low as possible in the trough to increase the head of molten aluminum to establish the required velocity through the measuring tube for proper operation of the flow meter. This is achieved by making the magnet larger above the tube and smaller under the tube.

In addition, a housing is preferably provided around the magnets. Cooling fluid, preferably air, is circulated through the housing to maintain the appropriate operating temperature for the magnet.

Another aspect of the invention is directed to the method of measuring the flow rate of molten aluminum in a trough by damming off the flow and diverting all of the flow through the measuring tube of a magnetic flow meter. The measuring tube is located at a level in the trough and has a diameter, which taken together with a range of the flow rates of the molten aluminum in the trough, creates a head of dammed up molten aluminum at the measuring tube which produces the flow rate required by the process and within the operating range of the flow meter. Preferably, two spaced apart dams are formed in the trough with a cavity between which is traversed by the measuring tube, and the magnet of the flow meter is located in the cavity adjacent the measuring tube where it is at least partially protected from the heat of the molten aluminum. Preferably, cooling air is circulated through the cavity and over the magnet.

Furthermore, flow meters in accordance with the invention having a non-reactive measuring tube and non-reactive electrodes which maintain stable electrical and physical parameters despite prolonged contact with molten aluminum can also be used for measuring the flow of molten aluminum out of a furnace or other vessel or even through a pipe.

BRIEF DESCRIPTION OF THE DRAWINGS

A full understanding of the invention can be gained from the following description of the preferred embodiments when read in conjunction with the accompanying drawings in which:

FIG. 1 is an isometric view illustrating schematically a flow meter in accordance with the invention installed in a trough containing a flow of molten aluminum.

FIG. 2 is an end view of the flow meter illustrated in FIG. 1.

DESCRIPTION OF THE PREFERRED EMBODIMENT

Figure 3:
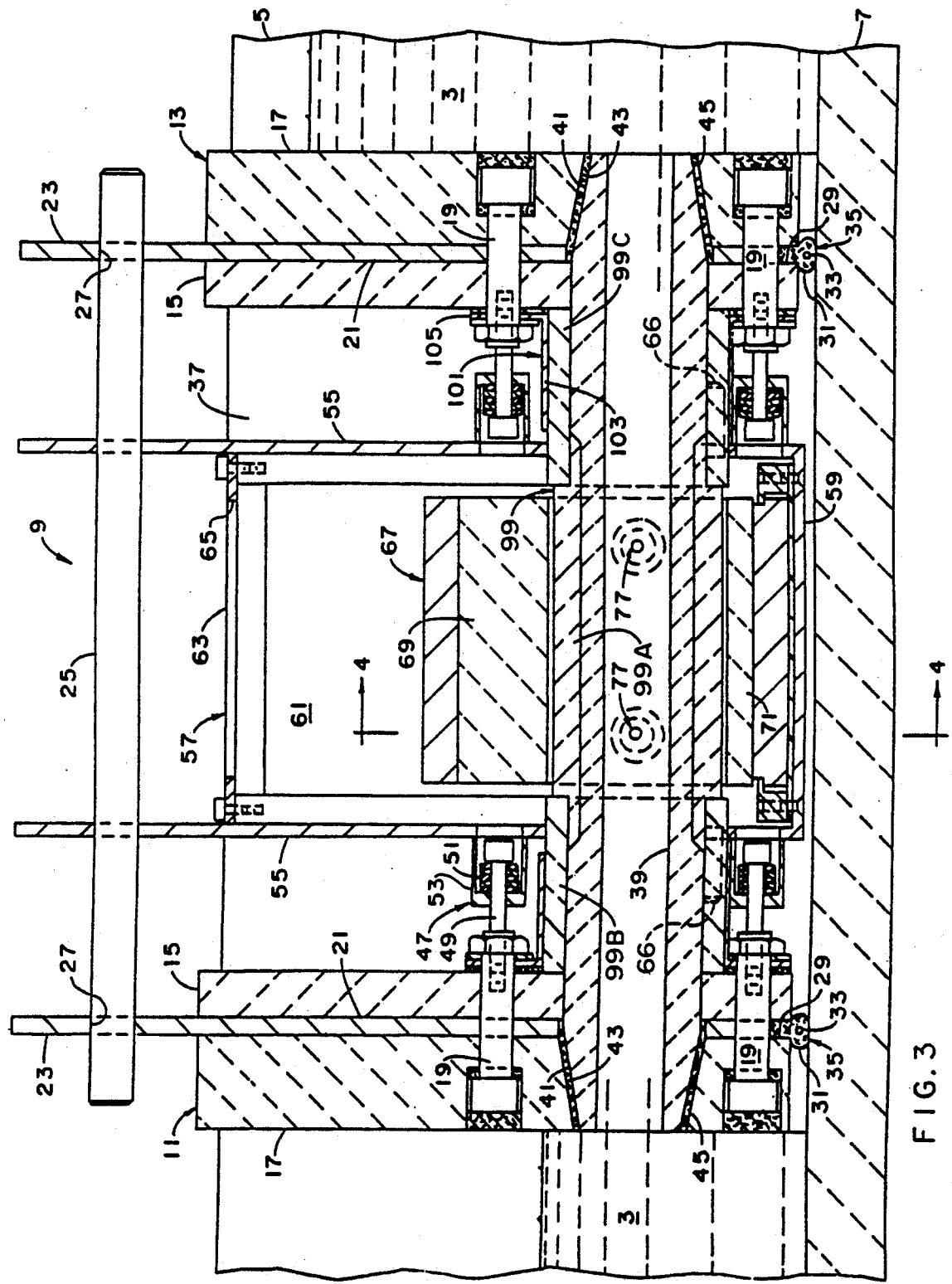
FIG. 3 is a longitudinal sectional view through the flow meter taken along the line 3—3 in FIG. 2.

FIG. 1 illustrates a trough 1 containing a flow of molten aluminum 3. The trough 1 which is made of a refractory material resistant to corrosion by the molten aluminum, is trapezoidal in cross-section with inclined side walls 5 and a bottom wall 7. A magnetic flow meter 9, in accordance with the invention, is inserted in the trough 1 to measure the flow rate of the molten aluminum 3.

The magnetic flow meter 9 comprises two spaced apart dam members 11 and 13. As shown in FIGS. 2 and 3, each of the dam members 11 and 13 comprises trapezoidal inner and outer panel members 15 and 17, respectively, clamped together by four bolts 19. A support plate 21 clamped between the panel members 15 and 17 has an upward extension 23. A rod 25 secured in holes 27 in the extensions 23 serves as a handle for the flow meter 9. A refractory board which is resistant to corrosion by the molten aluminum and has low thermal conductivity is used for the panel members 15 and 17. A suitable refractory board is A1300, HT available from Gerg Industrial Products International, Inc. The support plate 21 is slightly smaller than the panel member 15 and 17 thereby forming a peripheral groove 29 on the sides and bottom of the dam members 11 and 13. Refractory blanket material 31 is folded over a refractory cord 33 and clamped in the peripheral groove 29 to form a peripheral seal 35 for each of the dam members 11 and 13. The seals 35 prevent molten aluminum from entering a cavity 37 formed between the spaced apart dam members.

A measuring tube 39 traverses the cavity 37 and extends through the dam members 11 and 13. The ends of the measuring tube 39 have an axial taper 41 which seats in tapered apertures 43 in the dam members 11 and 13. Furnace tapping hole seals 45 serve as packing between the tapered ends 41 of the tube 39 and the tapered apertures 43 to provide a leak proof connection between the tube and the dam members. The measuring tube 39 is made from a material which is resistant to corrosion by the molten aluminum. Boron nitride was used in the exemplary flow meter. Another suitable material is silicon carbide, although this material is less resistant to thermal shock than boron nitride.

The tapered connections between the measuring tube 39 and the dam members 11 and 13 are biased into leak proof engagement by spring mechanisms 47. In the exemplary embodiment of the invention shown, the spring mechanisms 47 include additional bolts 49 threaded into tapped bores in the ends of the bolts 19. The heads of the bolts 49 bear against a series of Belleville springs 51 seated against bosses 53 welded to the end walls 55 of a housing 57. The Belleville springs 51 draw the dam members 11 and 13 against the tapered ends of the measuring tube 39 to effect a leak proof seal which accommodates for variations in the coefficients of thermal expansion of the measuring tube and the dam members.

The housing 57, which may be fabricated from sheet metal, is suspended in the cavity 37 from the handle 25 by the end walls 55 with a bottom wall 59 spaced from the bottom wall 7 of the trough. The housing 57 is enclosed by side walls 61 and has a lid 63 with an opening 65. Two pins 66 project outwardly from each side wall 55 adjacent an opening for the measuring tube 39.

Figure 4:
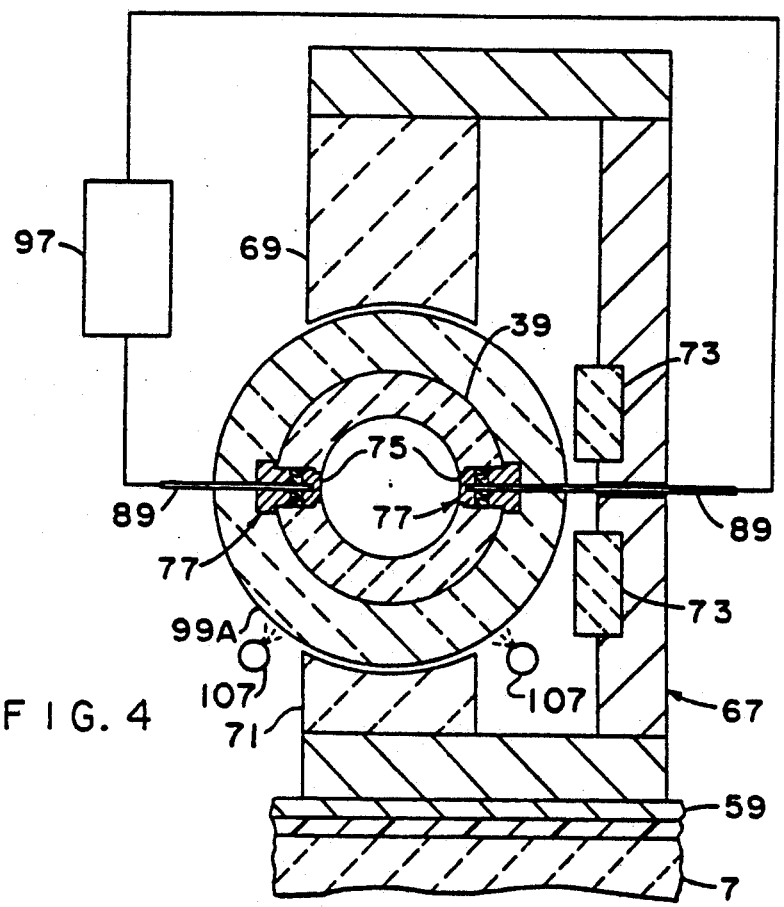
FIG. 4 is a cross-sectional view through the tube and magnet of the flow meter showing the details of the electrical leads, and taken along the line 4—4 in FIG. 3.
Figure 4A:
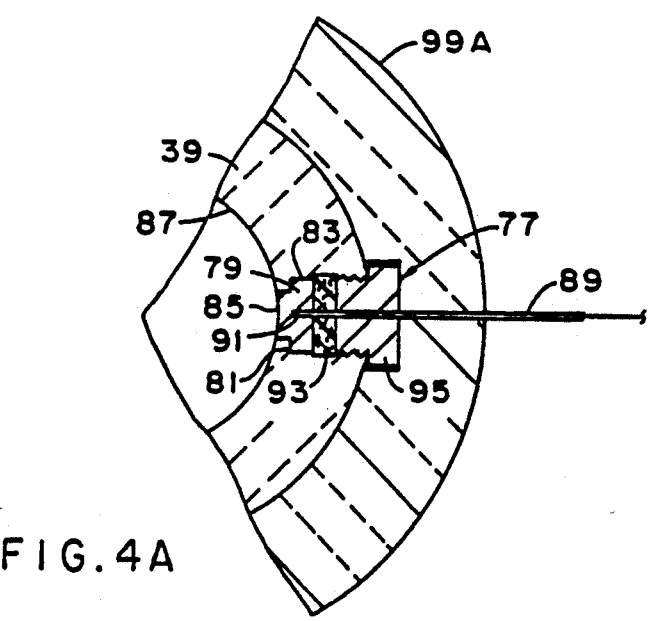
FIG. 4A is an enlargement of a section of FIG. 4.

The housing 57 forms an enclosure for the magnet 67 of the flow meter. The magnet 67 includes a C shaped low reluctance yoke 68, an upper pole piece 69 and a lower piece 71, as best seen in FIG. 4. The magnet 67 straddles the measuring tube 39 which extends through the end wall 55 of the enclosure 57. The lower pole piece 71 is smaller in height than the upper pole piece 69 so that the measuring tube 39 may be located as low as possible in the trough 1, for reasons to be explained later. The magnet 67 generates a flux oriented vertically through the measuring tube 39. Compensation pole pieces 73 modify the flux through the measuring tube 39 to make it more uniformly vertical. The exemplary pole pieces 69-73 are crumax 55 ceramic magnets produced by Crucible magnet Company. Alternatively, an electro-magnet can be used in place of a the permanent magnets.

Two pair of diametrically opposite electrode assemblies 77 are provided in measuring tube 39. The electrode assemblies 77 include an electrode 79, having a shoulder 81 which seats in a counter bored aperture 83 through the measuring tube with the end face 85 of the electrode flush with the inner wall 87 of the measuring tube 39 so that it contacts molten metal flowing through the measuring tube without causing a turbulent flow. The electrode 79 is made from an electrically conductive material which is resistant to corrosion by the molten aluminum. In the preferred embodiment of the invention, the electrode 79 is made of titanium diboride. An electrical lead 89 is connected to the electrode 79. This electrical lead 89 must be resistant to the high operating temperatures of the device. In the exemplary flow meter, the electrical lead 89 is made of stainless steel. It is very difficult to secure such a lead to the titanium diboride electrode. We have vacuum brazed the electrical lead in a bore 91 in the electrode using a palladium flux. Other suitable materials for the electrodes 79 include zirconium diboride and hafnium diboride.

The electrode assembly 77 further includes a packing 93 of refractory material and a plug 95 which threads into the counterbored aperture 83 in the measuring tube 39. Thus, the electrode is firmly secured in the measuring tube 39, but can easily be replaced as required.

The diametrically opposite electrodes 79 of each of the electrode pairs 75 form separate panels for measuring the flow of molten aluminum through the tube 39. To the this end, the leads 89 are connected to conventional signal processing equipment shown schematically at 97 which measures the voltage generated across each electrode pair 75 and produces a reading of molten aluminum flow rate. As mentioned previously, the voltage produced across each electrode pair is a measure of the velocity of the molten aluminum. As the cross-section of the measuring tube 39 is known, the flow rate is easily calculated. The two separate channels formed by the electrode pairs 75 provide redundancy for reliability, increased signal strength and calibration checking.

As discussed above, the temperature of the molten aluminum can reach for instance, 1350° F. On the other hand, excessive temperature can demagnetize the magnet 67. It is desirable in the exemplary flow meter that the temperature of the magnet not reach more than about 150° F. In order to protect the magnets from the very high temperature of the molten aluminum, the measuring tube 39 is wrapped with an insulating sleeve 99. In the exemplary flow meter Pyrolite Q-3083, a trademarked product provided by Rex Roto Corporation was used. This sleeve had a wall thickness of 0.5 inches (1.27 cm). The insulating sleeve 99 extends along the full length of the tube 39 between the dam members 11 and 13. In order to reduce the gap between the pole piece 69 and 71, the center section of the measuring tube 39 in grooved as seen in FIG. 4. The insulating sleeve 99 has three sections. The center section 99A, which is split longitudinally for placement around the grooved section of the measuring tube 39 is rabbeted at each end. The end sections 99B and 99C of the insulating sleeve 99 slide over the rabbeted ends of the section 99A to form lap joints.

Insulation retainers 101 having cylindrical collars 103 and radial flanges 105 which are bolted to the dam members 11 and 13 by the bolts 19 secure the insulating sleeve 99 to the outside of the measuring tube 39. The pins 66 projecting from the end wall 55 of the enclosure 57 extend into the collars 103 to support and align the housing.

The magnet 67 is further protected from the high temperature of the molten aluminum by the circulation of cooling air which is introduced into the bottom of the housing 57 through apertured conduits 107 and flows upward and out through the opening 65 in lid 63.

In use, the magnetic flow meter 9 is carried by the handle 25 and placed into the trough 1. The peripheral seals 35 around the dam members 11 and 13 seal the dam members against the side walls and bottom wall of trough 1 so that all flow of molten aluminum is diverted through the measuring tube 39. The inner diameter of the measuring tube 39 is selected in conjunction with the head of molten metal on the upstream side of the flow meter to provide a velocity of the molten aluminum through the measuring tube 39 which is within the operating range of the flow meter. Generally a velocity of at least about 1.5 feet per second is desirable to provide reliable readings, and it is recommended that preferably the velocity be between about 6 to 9 feet per second. As mentioned above, the lower pole piece 71 of the magnet 67 is made smaller than the upper pole piece 69. This is done so that the measuring tube may be moved as low as possible to increase the head of molten metal on the upstream side of the meter to obtain the desired flow rate.

The magnet flow meter of the invention is not limited to measuring the flow of molten aluminum in a trough, but can also be used for measurement of molten aluminum flowing from a furnace outlet or through a closed conduit.

While specific embodiments of the invention have been described in detail, it will be appreciated by those skilled in the art that various modifications and alternatives to those details could be developed in light of the overall teachings of the disclosure Accordingly, the particular arrangements disclosed are meant to be illustrative only and not limiting as to the scope of the invention which is to be given the full breadth of the appended claims and any and all equivalents thereof.

What is claimed is:

1. A magnetic flow meter for measuring the flow of molten aluminum, said flow meter comprising:
   a non magnetic measuring tube having a bore through which the molten aluminum flows, said bore having an electrically insulating surface resistant to corrosion by the flow of molten aluminum;
   a pair of spaced apart titanium diboride electrodes extending through the said measuring tube and contacting said flow of molten aluminum, said electrodes being electrically conductive and resistant to corrosion by the flow of molten aluminum;
   a magnet mounted adjacent said measuring tube and generating a magnetic flux transversely through said flow of molten aluminum through said bore of said measuring tube and over said electrodes; and
   means measuring a voltage proportional to said flow of aluminum produced across said electrodes by interaction of said magnetic flux with said flow of molten aluminum.

2. The flow meter of claim 1 wherein said measuring tube is made of boron nitride.

3. The flow meter of claim 1 wherein said measuring tube is made of silicon carbide.

4. A magnetic flow meter for measuring the flow of molten aluminum through a trough, said flow meter comprising:
   a measuring tube having a bore with a non-electrically conductive surface which is resistant to corrosion by molten aluminum;

a pair of dam members, one adjacent each end of said measuring tube diverting all flow of molten aluminum in said trough through said measuring tube, and forming a cavity in said trough therebetween which is free of molten aluminum and is traversed by said measuring tube;

magnet means mounted in said cavity adjacent said measuring tube generating magnetic flux transverse to molten aluminum flowing through said measuring tube;

a pair of spaced apart electrodes extending through said flow tube and contacting said flow of molten aluminum, said electrodes being electrically conductive and resistant to corrosion by the flow of molten aluminum; and means measuring a voltage proportional to said flow of aluminum produced across said electrodes by interaction of said magnetic flux with said flow of molten aluminum.

5. The flow meter of claim 4 wherein said measuring tube has axially tapered ends and said dam members have mating tapered apertures in which said tapered ends of said measuring tube seat, and including spring bias means urging said mating ends of said measuring tube and aperture, in said dams axially into leak-proof mating relation.

6. The flow meter of claim 5 including packing seals in said tapered apertures in said dam members which are urged against said tapered ends of said measuring tube by said spring bias means, said packing seals being resistant to corrosion by molten aluminum.

7. The flow meter of claim 4 including peripheral seal means around said dam members forming leak proof seals with said trough to keep molten aluminum out of said cavity.

8. The flow meter of claim 7 wherein said dam members each have a peripheral edge with a groove therein, said peripheral seals being seated in said grooves and extending laterally outward to seal against said trough.

9. The flow meter of claim 4 including a housing in said cavity surrounding said measuring tube and in which said magnet means is housed.

10. The flow meter of claim 9 including means circulating a coolant fluid through said housing to cool said magnet means.

11. The flow meter of claim 4 wherein said magnet means comprises an upper magnet member, a lower magnet member, and a magnetically permeable frame supporting said upper magnet member above said measuring tube and said lower magnet member under said measuring tube, and providing a low reluctance flux path therebetween, said lower magnet member having a substantially smaller vertical height than said upper magnet member to permit said measuring tube to traverse said cavity between said dam members adjacent a bottom of said trough.

12. The flow meter of claim 4 including lifting means connected to said dam members providing a grip for inserting and removing said flow meter from said trough.

13. The flow meter of claim 4 wherein said electrodes are titanium diboride.

14. A magnetic flow meter for measuring the flow of molten aluminum through a trough, said flow meter comprising a pair of spaced apart dam members insertable in said trough to block flow of aluminum and forming a cavity in the trough therebetween;

a measuring tube extending through said cavity and said dam members and having a bore through which said molten aluminum flows, said bore having a non-electrically conductive surface which is resistant to corrosion by molten aluminum said measuring tube having axially tapered ends and said dam members having mating tapered apertures in which said tapered ends of said measuring tube seat;

spring bias means urging said mating ends of said measuring tube and apertures in said dams axially into leak proof mating relation;

peripheral seals around said dam members which seal against said trough to keep molten aluminum out of said cavity;

a pair of spaced apart titanium diboride electrodes extending through said measuring tube and contacting said flow of molten aluminum;

a housing inside said cavity and surrounding at least a portion of said measuring tube; and a magnet mounted adjacent said measuring tube inside said housing and generating a magnetic flux transversely through the flow of molten aluminum through said bore of said measuring tube and over said electrodes; and means measuring a voltage proportional to said flow of aluminum produced across said electrodes by interaction of said magnetic flux with said flow of molten aluminum.

15. The flow meter of claim 14 including means circulating a cooling fluid through said housing and over said magnet.

16. A method of measuring flow rate within a given range of molten aluminum through a trough, comprising the steps of:

damming off the flow of molten aluminum and diverting all flow through a measuring tube of a magnetic flow meter with a given flow rate operating range located at a level in the trough and having a diameter, which taken together for said given range of flow rate of molten aluminum through said trough creates a head of dammed up molten aluminum at the measuring tube which produces a flow rate through said measuring tube which is within said given flow operating range of said magnetic flow meter, and measuring the flow of molten aluminum through said measuring tube with said magnetic flow meter.

17. The method of claim 16 wherein said step of damming off the flow of molten aluminum in said trough comprises forming two spaced apart dams with a cavity between which is traversed by said measuring tube, and locating magnetic means for said magnetic flow meter in said cavity adjacent said measuring tube.

18. The method of claim 17 including the step of circulating a cooling fluid through said cavity around said magnetic means to cool said magnet means.

* * * * *